(12) United States Patent
Ishimura et al.

(10) Patent No.: US 7,849,230 B2
(45) Date of Patent: Dec. 7, 2010

(54) OVERTAKE REQUEST CONTROL APPARATUS AND OVERTAKE REQUEST CONTROL METHOD

(75) Inventors: Naoya Ishimura, Kawasaki (JP); Hiroyuki Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 12/222,228

(22) Filed: Aug. 5, 2008

(65) Prior Publication Data

US 2009/0013105 A1 Jan. 8, 2009

Related U.S. Application Data

(63) Continuation of application No. PCT/JP2006/303683, filed on Feb. 28, 2006.

(51) Int. Cl.
*G06F 3/00* (2006.01)
*G06F 13/00* (2006.01)
*G06F 7/38* (2006.01)

(52) U.S. Cl. .............................. 710/5; 710/32; 710/36; 712/220

(58) Field of Classification Search ....................... None

See application file for complete search history.

(56) References Cited

U.S. PATENT DOCUMENTS

| 6,681,270 B1 | 1/2004 | Agarwala et al. |
| 2003/0056034 A1 * | 3/2003 | Olds et al. ..................... 710/5 |

FOREIGN PATENT DOCUMENTS

| JP | 03-025558 | 2/1991 |
| JP | 5-120195 | 5/1993 |
| JP | 2001-217894 | 8/2001 |

OTHER PUBLICATIONS

International Search Report issued in PCT/JP2006/303683.

* cited by examiner

*Primary Examiner*—Alan Chen
(74) *Attorney, Agent, or Firm*—Staas & Halsey LLP

(57) ABSTRACT

A request control apparatus and a request control method are configured such that when an A type request that is an overtaking acceptable request allowed to overtake and to be overtaken among the other requests is turned to a retry matter on a pipeline, a request-order control unit performs an information renewal such that the A type request is rearranged to a place immediately preceding a B type request that is an overtaking inhibited request inhibited to overtake or to be overtaken among the other requests, and a request fetching unit fetches requests from ports by using the information renewed by the request-order control unit. Moreover, the request-order control unit is configured to perform request order control per request source.

8 Claims, 7 Drawing Sheets

OVERTAKE REQUEST CONTROL APPARATUS AND OVERTAKE REQUEST CONTROL METHOD

CROSS REFERENCE TO RELATED APPLICATIONS

This is a continuing application, filed under 35 U.S.C. §111(a), of International Application PCT/JP2006/303683, filed Feb. 28, 2006, the contents of which are incorporated herein by reference.

BACKGROUND OF THE INVENTION

1. Field of the Invention

The present invention relates to a request control apparatus and request control method for fetching requests from ports and inputting them to a pipeline.

2. Description of the Related Art

Conventionally, there has been known a request control apparatus that fetches requests set in ports that are provided in parallel, and inputs the requests to a pipeline. The request control apparatus fetches in order requests that are input to respective ports by a processing device, such as a central processing unit (CPU), and inputs the fetched requests to the pipeline in the order of the fetch.

However, the request control apparatus has a risk of hang-up when the number of ports is more than the number of requests that can be simultaneously input to the pipeline (hereinafter, "pipeline length"). For example, suppose the number of the ports is eight, the pipeline length is four, and requests set in the ports are to be input to the pipeline on a first-come, first-served basis. In such case, four requests are input to the pipeline on a first-come, first-served basis, and when a requirement for processing of the four requests on the pipeline is imposed that processing of a specific request remaining in a port has been completed, if the four requests are repeatedly retried on the pipeline, pipeline processing hangs up.

To solve such problem, it can be conceivable to control relation between the number of the ports and the pipeline length. For example, it is conceivable to set the number of ports to equal to or fewer than the number of requests that can be simultaneously input to the pipeline; however, reduction of the number of ports is not preferable in terms of processing efficiency. It is also conceivable to cope with the problem by setting a longer pipeline length; however, it is not preferable because a delay may occur in pipeline processing.

For this reason, various request control methods have been proposed that are configured to cope with the problem by changing an order of fetching requests from the ports. For example, there is a technology of rearranging a request that is turned to a retry matter on a pipeline to the last place of a fetching order. Moreover, there is a technology of advancing in a fetching order a request of which processing is required to be completed prior to processing of another request regardless of an arrival order.

However, the conventional technology for rearranging the request order can produce an effect only when dealing with requests acceptable for overtaking between the requests. In other words, the conventional technology may lead to reduction in performance of request processing when a partial overtaking inhibition is imposed among requests to be processed.

For this reason, it is a challenge how to implement a request control method that does not cause hang-up or reduction in performance of request processing, even when a partial overtaking inhibition is imposed among the requests to be processed.

SUMMARY

It is an object of the present invention to at least partially solve the problems in the conventional technology.

According to an aspect of the present invention, a request control apparatus that fetches requests from ports each of which holds any one of an overtaking inhibited request that inhibits to be overtaken by another request and to overtake another request and an overtaking acceptable request that does not inhibit overtaking, and inputs the requests to a pipeline, includes a request-type determining unit that determines whether a request is any one of the overtaking inhibited request and the overtaking acceptable request; and a request-order control unit that changes a fetching order of a request to a place immediately preceding a request order of the overtaking inhibited request when the request is fetched from one of the ports, turned to a retry request on the pipeline, and determined as the overtaking acceptable request by the request-type determining unit.

According to another aspect of the present invention, a request control method that fetches requests from ports each of which holds any one of an overtaking inhibited request that inhibits to be overtaken by another request and to overtake another request and an overtaking acceptable request that does not inhibit overtaking, and inputs the requests to a pipeline, includes determining whether a request is any one of the overtaking inhibited request and the overtaking acceptable request; and changing a fetching order of a request to a place immediately preceding a request order of the overtaking inhibited request when the request is fetched from one of the ports, turned to a retry request on the pipeline, and determined as the overtaking acceptable request by the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The following description explains a case where a request control method according to an embodiment of the present invention is applied to a request control apparatus provided in between a pipeline and ports shared between two central processing units (CPU) cores.

Figure 1:
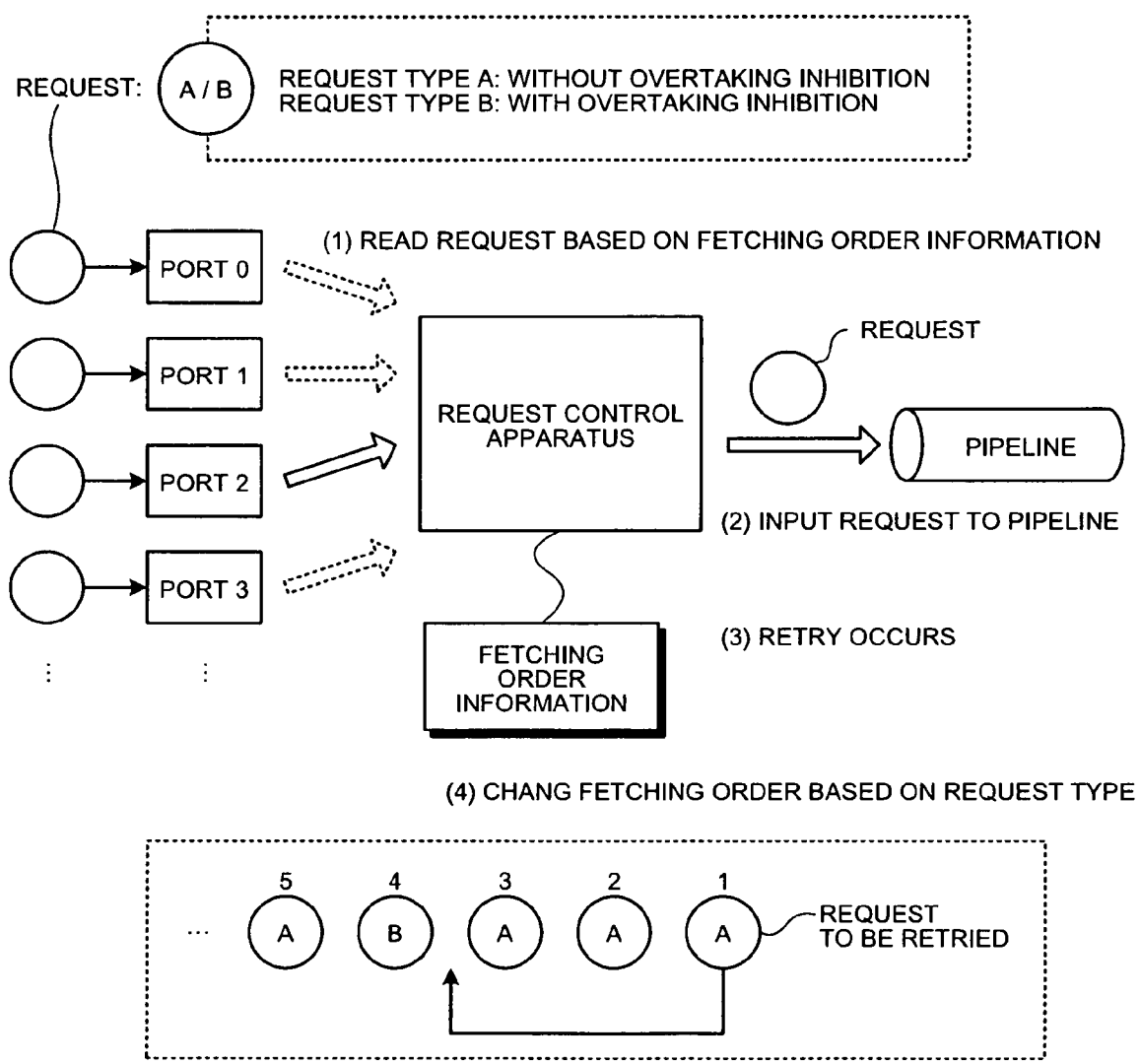
FIG. 1 is a schematic diagram of an outline of a request control method according to an embodiment of the present invention.

To begin with, an outline of the request control method according to the embodiment of the present invention is explained below with reference to FIG. 1. FIG. 1 is a schematic diagram of an outline of a request control method according to an embodiment of the present invention. Each port shown in FIG. 1 is assumed to hold a request that is input. As shown in FIG. 1, there are request types A and B among requests input to the ports. The request type A is a type of which a request is allowed to overtake another request and to be overtaken by another request; by contrast, the request type B is a type of which a request is inhibited to overtake any other request and to be overtaken by any other request. Hereinafter, a request of the request type A is referred to as an A type request, and a request of the request type B is referred to as a B type request.

As shown in FIG. 1, the request control apparatus reads a request from each of the ports (see section (1) in FIG. 1) based on fetching order information, which will be described later, and inputs the read request to the pipeline (see section (2) in FIG. 1). If a retry or retry operation occurs among the requests input to the pipeline (see section (3) in FIG. 1), the fetching order is changed based on the request type (see section (4) in FIG. 1), and fetching order information is updated.

The fetching order changing shown in section (4) in FIG. 1 is explained below in detail. As shown in a rectangle of a broken line in FIG. 1, it is assumed that requests are queued in order from a prior fetching order, for example, 1, 2, 3, and so on. In such case, if an A type request at the top place is turned to a retry matter on the pipeline, the A type request is rearranged to a posterior place. Specifically, the A type request to be retried is rearranged to a place immediately preceding a B type request that appears first. In other words, the A type request to be retried is rearranged to the last of the A type request queue.

In this way, a request to be retried can be postponed in the fetching order without breaking a constraint on a B type request imposed with an overtaking inhibition, so that requests queued at the second and the third places in FIG. 1 can be processed ahead. In other words, a fetching opportunity can be given to all ports, hang-up as described in the related art can be prevented.

When a superordinate request in the fetching order is turned to a retry matter, a subordinate request in the fetching order can be input to the pipeline, so that processing efficiency of request processing can be improved. Even if a request to be retried is immediately re-input to the pipeline, it is highly possible that the request is again turned to a retry matter, therefore, rearrangement of the request to be retried to the last of the A type request queue has no disadvantage.

Figure 2:
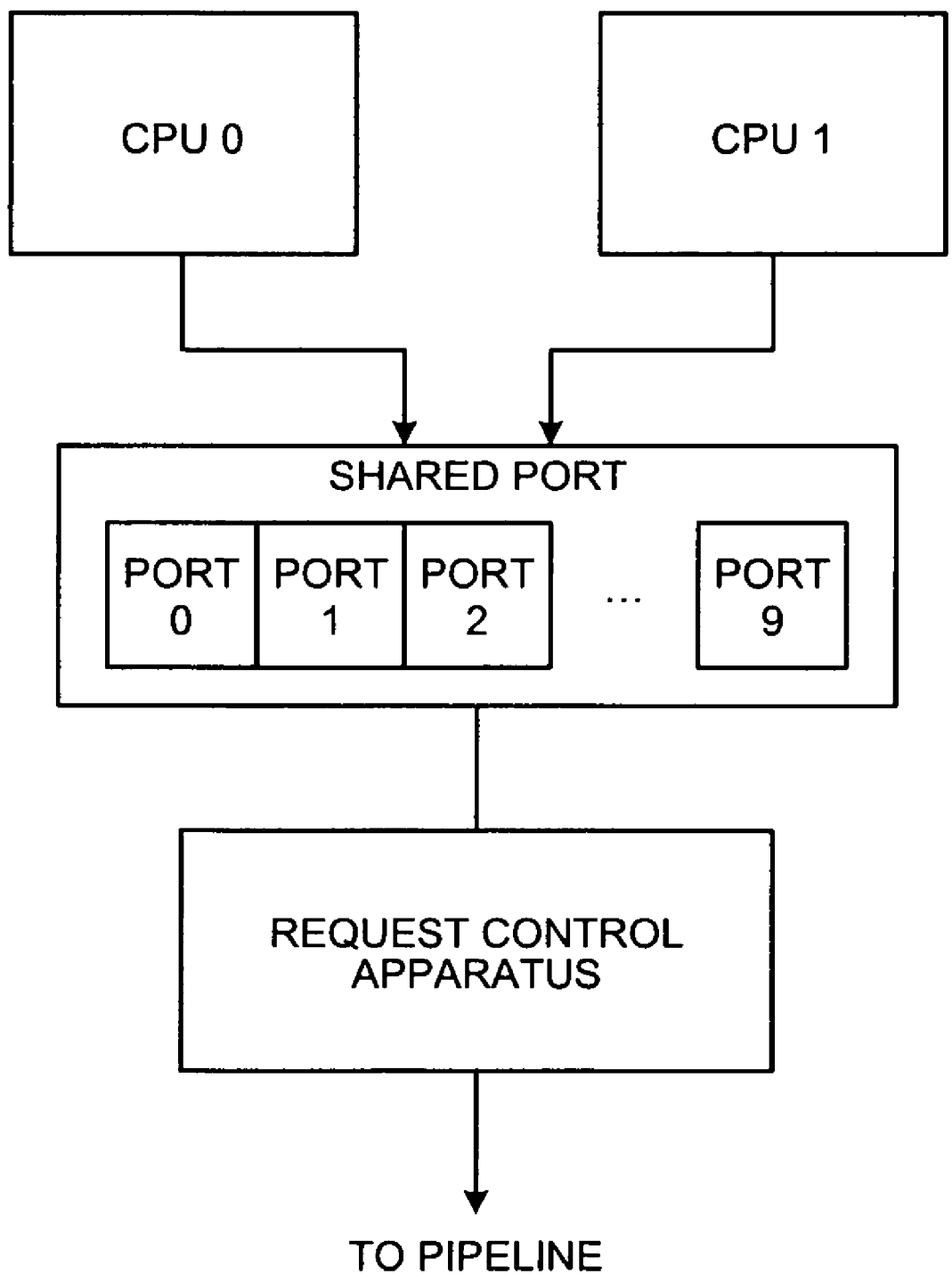
FIG. 2 is a schematic diagram of a request control apparatus that employs the request control method of the embodiment.

The request control apparatus that employs the request control method according to the embodiment is explained below with reference to FIG. 2. FIG. 2 is a schematic diagram of a request control apparatus that employs the request control method of the embodiment. As shown in FIG. 2, the request control apparatus is provided in between a pipeline and ports shared between two CPU cores, namely, a CPU core 0 and a CPU core 1, and configured to perform processing of inputting a request fetched from each of the shared ports to the pipeline.

According to FIG. 2, ten ports, namely, ports 0 to 9, are provided as the shared ports. Generally, if dedicated ports are provided to each of the CPU cores, each of the CPU cores requires approximately six ports. However, as shown in FIG. 2, when the ports are configures as shared ports, the number of the ports can be reduced to approximately ten. The reason for this is because the number of requests output from each of the CPU cores is not even, and a shortage of ports is unlikely to occur in a long interval even if the number of the ports is relatively small.

Figure 3:
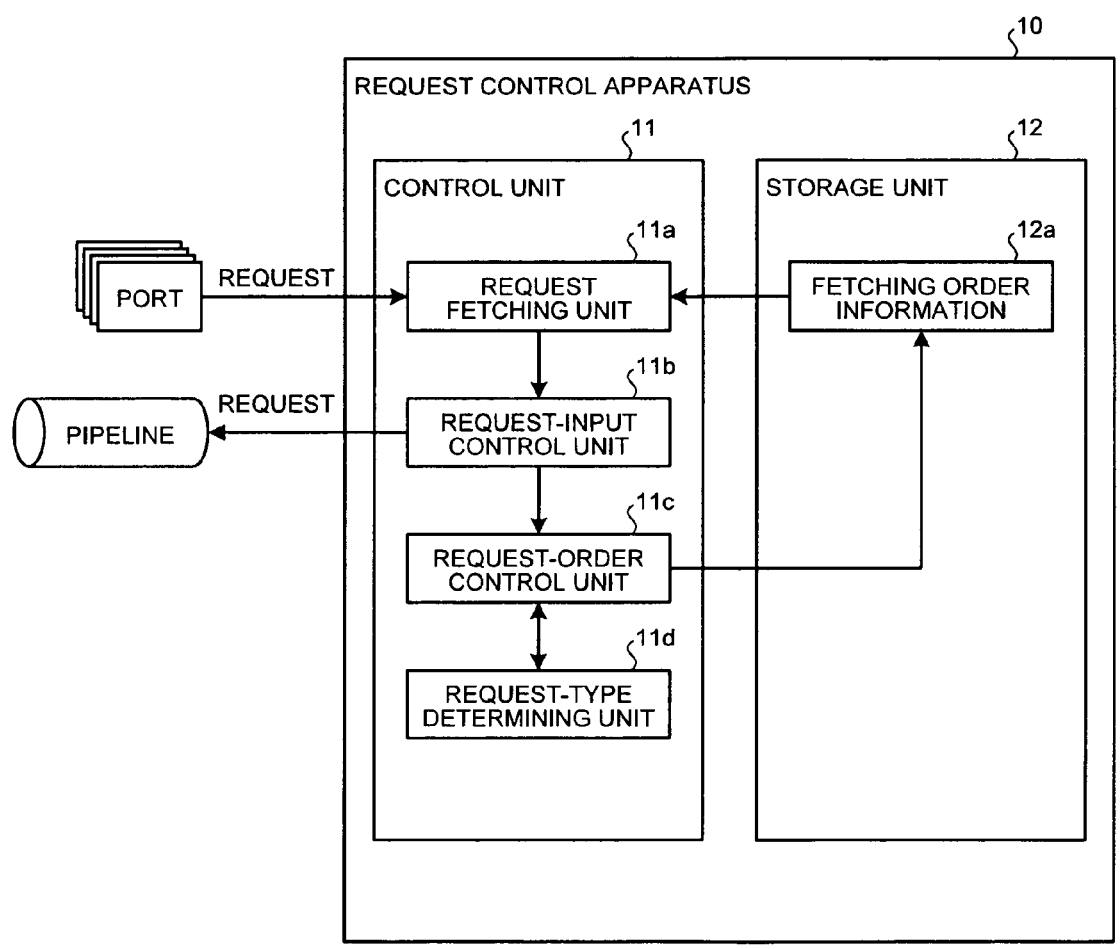
FIG. 3 is a functional block diagram of a configuration of the request control apparatus.

A configuration of a request control apparatus 10 according to the embodiment is explained below with reference to FIG. 3. FIG. 3 is a functional block diagram of a configuration of the request control apparatus 10. As shown in FIG. 3, the request control apparatus 10 includes a control unit 11 and a storage unit 12. The control unit 11 includes a request fetching unit 11a, a request-input control unit 11b, a request-order control unit 11c, and a request-type determining unit 11d, and the storage unit 12 stores therein fetching order information 12a.

The control unit 11 fetches a request set in each of the ports and inputs the request to the pipeline, and performs processing of changing the fetching order of a request that is turned to a retry matter (rearranging the request to be postponed in the fetching order).

From a port that holds a request at the top place in the fetching order, the request fetching unit 11a fetches the request based on the fetching order information 12a, and passes the fetched request to the request-input control unit 11b.

The request-input control unit 11b inputs the request passed from the request fetching unit 11a to the pipeline. Moreover, when receiving a signal that a request is turned to a retry matter on the pipeline, the request-input control unit 11b notifies the request-order control unit 11c of the situation.

The request-order control unit 11c performs processing of changing the fetching order of a request that is turned to a retry matter on the pipeline. Moreover, the request-order control unit 11c performs processing of registering the changed fetching order to the fetching order information 12a of the storage unit 12. The fetching order information 12a updated by the request-order control unit 11c is referred by the request fetching unit 11a, and used when the request fetching unit 11a determines from which port to fetch a request.

Figure 4:
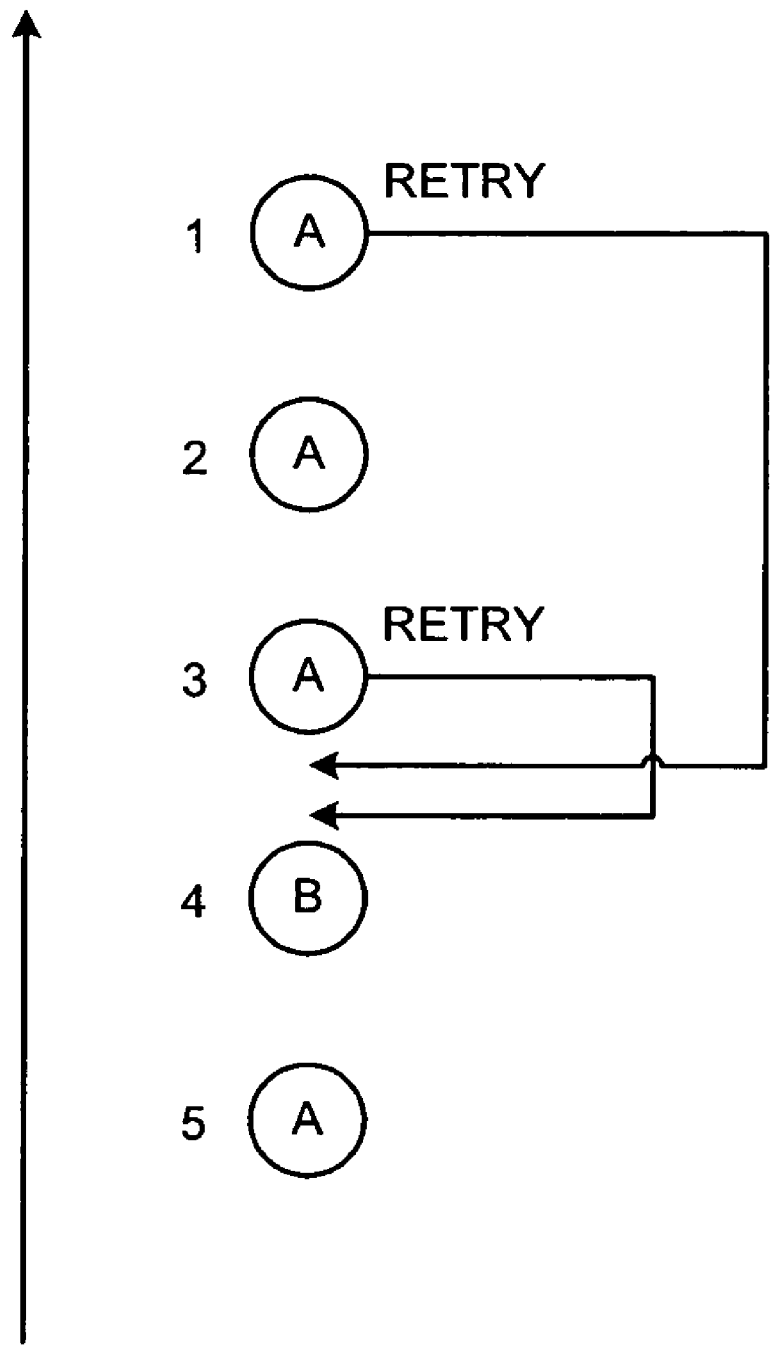
FIG. 4 is a schematic diagram of an example of request order changing performed by the request control apparatus.

An example of request order changing performed by the request-order control unit 11c is explained below with reference to FIGS. 4 and 5. FIG. 4 is a schematic diagram of an example of request order changing. As shown in FIG. 4, when an A type request at a fetching order 1 is turned to a retry matter, the A type request is rearranged to a place immediately preceding a B type request that is the earliest among B type requests in the fetching order (a B type request at a fetching order 4 in FIG. 4).

In other words, as the A type request at the fetching order 1 is rearranged to the last of the A type request queue, an A type request at a fetching order 2 is turned to available to be processed on the pipeline. If after the A type request at the fetching order 2 is normally processed, and an A type request at a fetching order 3 is turned to a retry matter, the A type request at the fetching order 3 to be retried is rearranged to a place immediately preceding the B type request at the fetching order 4.

Thus, when an A type request is turned to a retry matter, by rearranging the A type request to be retried to the last of the A type request queue (i.e., a place immediately preceding a B type request that comes first), request processing can be continued without breaking a constraint of an overtaking inhibition imposed on the B type request. For the purpose to simplify an explanation, it is explained above according to FIG. 4 in a case where requests are input from a single source.

However, the request control apparatus 10 can control the request order by distinguishing requests input from a plurality of sources.

An example of request order changing performed on requests input from different sources is explained below with reference to FIG. 5. FIG. 5 is a schematic diagram of an example of request order changing on requests input from different sources. According to FIG. 5, requests 1, 4, 6, 8, and 10 input from the CPU core 0, and requests 2, 3, 5, 7, and 9 input from the CPU core 1 are distinguished and shown by being enclosed with respective broken lines; however, it is assumed that the requests are to be arranged in one queue in accordance with the fetching order.

Figure 5:
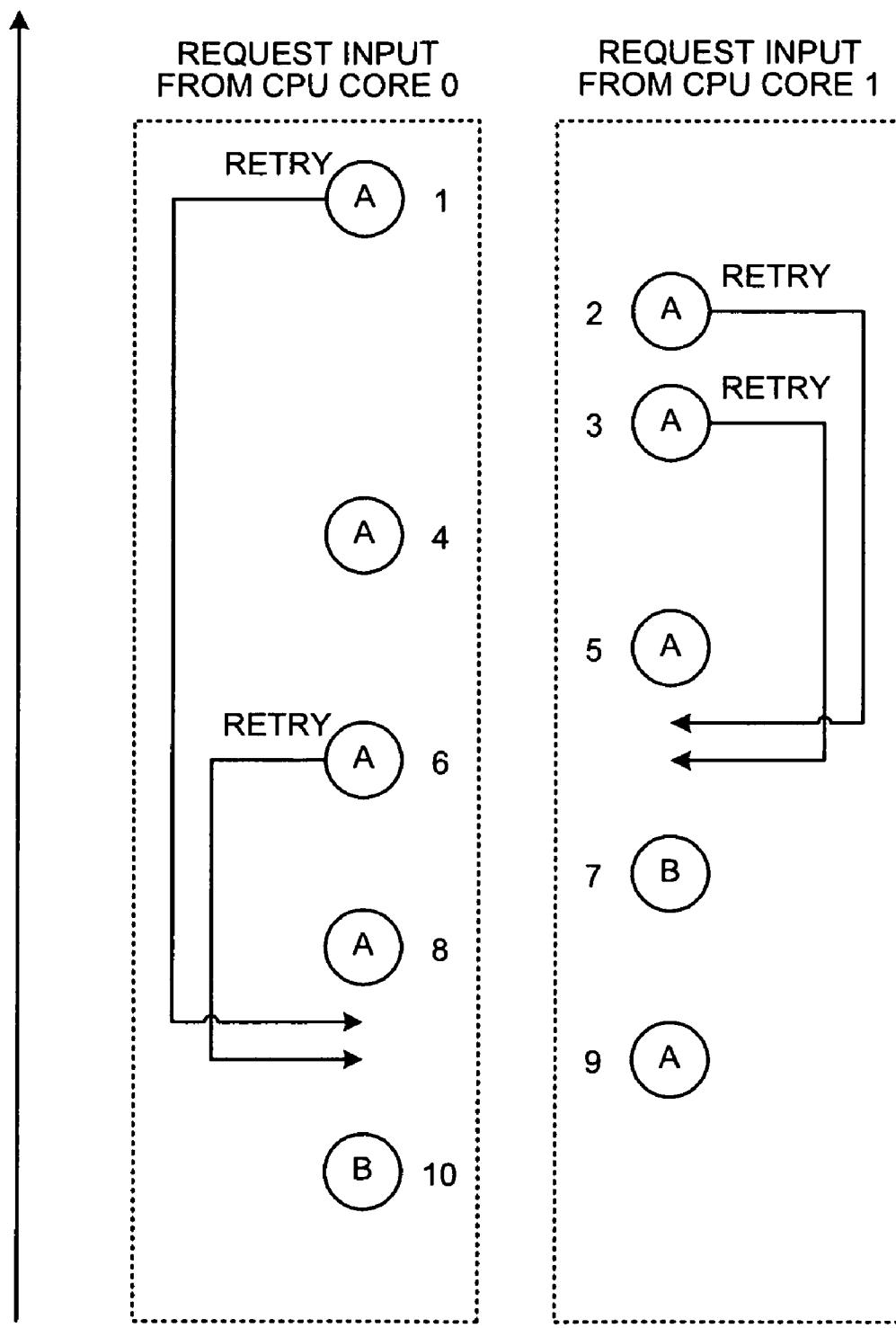
FIG. 5 is a schematic diagram of an example of request order changing performed by the request control apparatus on requests input from different sources.

As shown in FIG. 5, when A type requests input from the CPU core 0 are turned to retry matters, the requests are rearranged to a place immediately preceding a B type request input from the CPU core 0 (a B type request 10 shown in FIG. 5). Additionally when A type requests input from the CPU core 1 are turned to retry matters, the requests are rearranged to a place immediately preceding a B type request input from the CPU core 1 (a B type request 7 shown in FIG. 5).

Thus, as the request order is controlled source by source of the requests, the request order can be changed while maintaining the request order with respect to each of the CPU cores. Accordingly, even if requests fetched from shared ports shared among a plurality of CPU cores include requests imposed with an overtaking inhibition, request processing can be efficiently performed without hang-up.

Returning to explanations of FIG. 3, the request-type determining unit 11d is explained below. The request-type determining unit 11d determines a request type (the A type or the B type) of a request that the request-order control unit 11c is to deal with, and notifies the request-order control unit 11c of a determination result. The request-type determining unit 11d performs request type determination by reading a request type written on a predetermined portion of each request.

The storage unit 12 includes a memory circuit, such as a register, and stores therein the fetching order information 12a. The fetching order information 12a is information that represents a request fetching order to be updated by the request-order control unit 11c. An example of the fetching order information 12a is explained below. It is explained below in a case where the fetching order information 12a is configured as a logic circuit by using output signals from the register.

It is assumed in the following expressions that an output signal from the register is $ORD\_ij$ (i, j=0 to 9), and when $ORD\_ij$=1, a request j is fetched after a request i. Symbols "+" and "&" used in the following expressions denote logic gates of OR and AND, respectively.

First of all, information that a new request is to be queued at the last of a request fetching order is explained below. Suppose an instruction signal to set a new request output from each of the CPU cores to ID i (i=0 to 9) is $SET\_PORT\_i$, $ORD\_ij$ is renewed as follows:

$$ORD\_ij \Leftarrow (ORD\_ij + SET\_PORT\_j) \& !(SET\_PORT\_i) \quad (1)$$

Expression (1) represents that the new request is to be queued at the last of the request fetching order. If new requests are simultaneously received from both of the CPU cores, the CPU core 0 has precedence.

Then, information that an A type request is to be rearranged to a place immediately preceding a B type request is explained below. Suppose a flag of representing that it is a top A-type request queue from COREx (x=0 or 1) is $Cx\_VOTE\_i$ (i, j=0 to 9), CxVOTE_i is expressed as follows:

$$Cx\_VOTE\_i = ! \left( \sum_{j=0}^{9} (PORT\_j\_Cx\_B\_TYPE\_VAL \& ORD\_ji) \right) \& ! PORT\_i\_Cx\_B\_TYPE\_VAL \quad (2)$$

$$PORT\_i\_Cx\_B\_TYPE\_VAL = PORT\_i\_VAL \& PORT\_i\_Cx \& PORT\_i\_B\_TYPE \quad (3)$$

$PORT\_i\_Cx\_B\_TYPE\_VAL$ used in Expression (2) is expressed as Expression (3).

$PORT\_i\_VAL$ used in Expression (3) represents that an effective request is set in $PORT\_i$, and $PORT\_i\_Cx$ represents that a request source of $PORT\_i$ is COREx. $PORT\_B\_TYPE$ represents that $PORT\_i$ is $B\_TYPE$.

When $PORT\_i$ is turned to a retry on the pipeline, suppose a retry signal is $RETRY\_i$, $CxVOTE\_ij$ is expressed as follows:

$$Cx\_VOTE\_ij = Cx\_VOTE\_i \& Cx\_VOTE\_j \quad (4)$$

$ORD\_ij$ is then renewed as follows:

$$ORD\_ij \Leftarrow (ORD\_ij + RETRY\_j \& PORT\_j\_C0 \& C0\_VOTE\_ij) \& !(RETRY\_i \& PORT\_i\_C0 \& C0\_VOTE\_ij) \quad (5)$$

Furthermore, $ORD\_ij$ is renewed in the following expression, so that the value of $ORD\_ij$ is determined.

$$ORD\_ij \Leftarrow (ORD\_ij + RETRY\_j \& PORT\_j\_C1 \& C1\_VOTE\_ij) \& !(RETRY\_i \& PORT\_i\_C1 \& C1\_VOTE\_ij) \quad (6)$$

When fetching a request from each port, a port ID of a port from which the request is to be fetched is determined by using $ORD\_ij$. The calculation processing of $ORD\_ij$ described above additionally includes control of renewing $ORD\_ij$ such that a request code given with particularly high precedence of processing (such request code is generated only one in the same period) can be input on a top priority basis.

Figure 6:
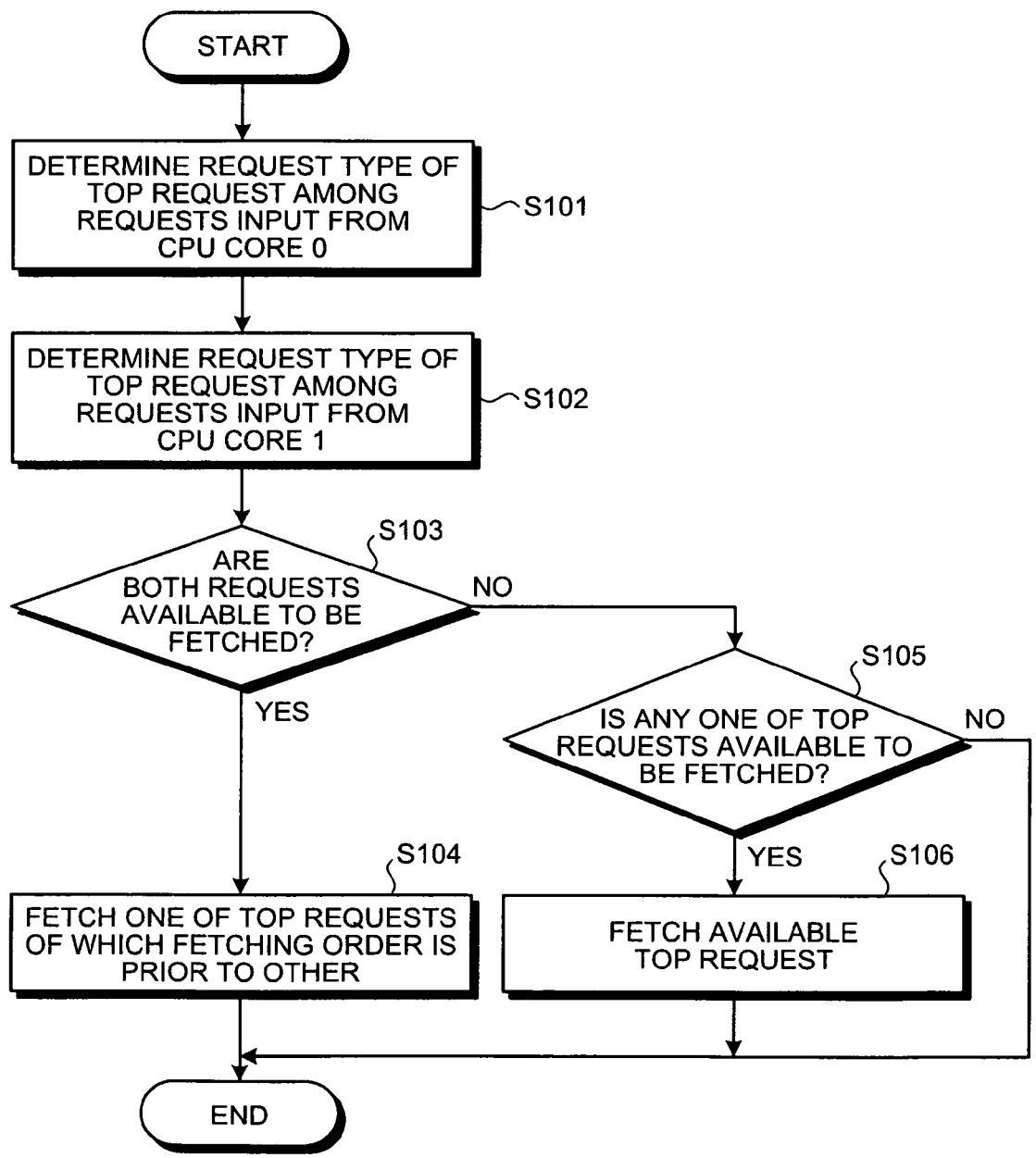
FIG. 6 is a flowchart of a process procedure of request fetching performed by the request control apparatus.

A process procedure of request fetching performed by the request control apparatus 10 is explained below with reference to FIG. 6. FIG. 6 is a flowchart of a process procedure of request fetching performed by the request control apparatus 10. As shown in FIG. 6, the request control apparatus 10 determines a request type of a top request among requests input from the CPU core 0 (Step S101), and then determines a request type of a top request among requests input from the CPU core 1 (Step S102). Subsequently, the request control apparatus 10 determines whether the both requests (the top request of the CPU core 0 and the top request of the CPU core 1) are available to be fetched (Step S103).

If the both top requests are available to be fetched (Yes at Step S103), the request control apparatus 10 fetches one of the top requests of which fetching order is prior to the other (Step S104), and then terminates the processing. By contrast, if the criterion at Step S103 is not satisfied (No at Step S103), the request control apparatus 10 further determines whether any one of the top requests is available to be fetched (Step S105). If one of the top requests is available to be fetched (Yes at Step S105), the request control apparatus 10 fetches the available top request (Step S106), and then terminates the processing. If the criterion at Step S105 is not satisfied (No at Step S105), the processing is directly terminated without fetching.

Figure 7:
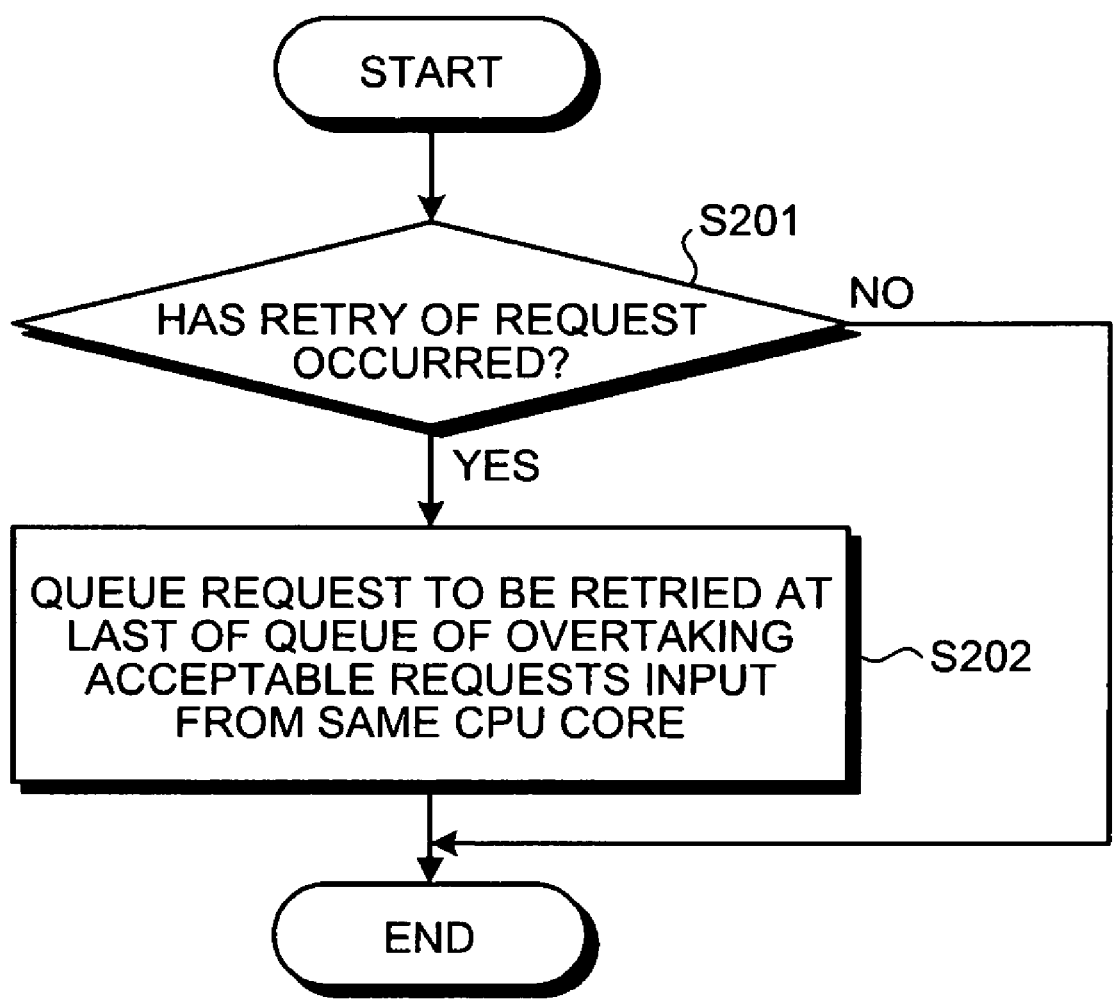
FIG. 7 is a flowchart of a process procedure of request order changing performed by the request control apparatus.

A process procedure of request order changing performed by the request control apparatus 10 is explained below with reference to FIG. 7. FIG. 7 is a flowchart of a process procedure of request order changing performed by the request control apparatus 10. As shown in FIG. 7, the request control apparatus 10 determines whether a retry of a request has occurred (Step S201). If a retry of a request has occurred (Yes at Step S201), the request to be retried is queued at the last of a queue of overtaking acceptable requests (A type request queue) input from the same CPU core (Step S202), and the processing is terminated. By contrast, if the criterion at Step S201 is not satisfied (No at Step S201), the processing is terminated without performing Step S202.

As described above, the embodiment is configured such that when an A type request that is an overtaking acceptable request allowed to overtake and to be overtaken among the other requests is turned to a retry matter on a pipeline, a request-order control unit performs an information renewal such that the A type request is rearranged to a place immediately preceding a B type request that is an overtaking inhibited request inhibited to overtake or to be overtaken among the other requests, and a request fetching unit fetches requests from ports by using the information renewed by the request-order control unit. According to the embodiment, even if a partial overtaking-inhibition is imposed among requests to be processed, neither hang-up nor degradation in performance of request processing is brought about. Moreover, a request order of requests input from the same source can be maintained.

According to the embodiment of the present invention, even if subject requests include some requests that are imposed with an overtaking-inhibition, hang-up or degradation in performance of request processing is not brought about by postponing a processing order of a request to be retried and giving a processing opportunity to the other requests while satisfying the overtaking-inhibition.

Moreover, an overtaking-inhibition can be complied.

Furthermore, a request order of requests input from the same source can be maintained.

Moreover, even when a request input from a certain source cannot be processed, a request input from another source can be processed. Accordingly, processing efficiency of request processing can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A request control apparatus that fetches requests from ports each of which holds any one of an overtaking inhibited request that inhibits to be overtaken by another request and to overtake another request and an overtaking acceptable request that does not inhibit overtaking, and inputs the requests to a pipeline, the request control apparatus comprising:

a request-type determining unit that determines whether a request is any one of the overtaking inhibited request and the overtaking acceptable request; and a request-order control unit that changes a fetching order of a request to a place immediately preceding a request order of the overtaking inhibited request when the request is fetched from one of the ports, turned to a retry request on the pipeline, and determined as the overtaking acceptable request by the request-type determining unit.

2. The request control apparatus according to claim 1, further comprising a request fetching unit that fetches the overtaking acceptable request provided that none of the overtaking inhibited request is present prior to a request determined as the overtaking acceptable request by the request-type determining unit.

3. The request control apparatus according to claim 1, wherein the request-type determining unit further determines a request source from which the request is input to the port, and the request-order control unit changes a fetching order of the retry request determined as the overtaking acceptable request by the request-type determining unit to a place immediately preceding the overtaking inhibited request associated with the request source of the retry request.

4. The request control apparatus according to claim 2, wherein the request fetching unit manages each fetching order of requests source by source, and when the request fetching unit cannot fetch a request at a top in a fetching order associated with a predetermined request source, the request fetching unit fetches a request at a top in a fetching order associated with another request source.

5. A request control method that fetches requests from ports each of which holds any one of an overtaking inhibited request that inhibits to be overtaken by another request and to overtake another request and an overtaking acceptable request that does not inhibit overtaking, and inputs the requests to a pipeline, the request control method comprising:

determining whether a request is any one of the overtaking inhibited request and the overtaking acceptable request; and changing a fetching order of a request to a place immediately preceding a request order of the overtaking inhibited request when the request is fetched from one of the ports, turned to a retry request on the pipeline, and determined as the overtaking acceptable request by the determining.

6. The request control method according to claim 5, further comprising fetching the overtaking acceptable request provided that none of the overtaking inhibited request is present prior to a request determined as the overtaking acceptable request by the determining.

7. The request control method according to claim 5, wherein the determining includes determining a request source from which the request is input to the port, and the changing includes changing a fetching order of the retry request determined as the overtaking acceptable request by the request-type determining step to a place immediately preceding the overtaking inhibited request associated with the request source of the retry request.

8. The request control method according to claim 6, wherein the fetching includes managing each fetching order of requests source by source, and when a request at a top in a fetching order associated with a predetermined request source cannot be fetched, the fetching includes fetching a request at a top in a fetching order associated with another request source.

* * * * *